(12) United States Patent
Jay et al.

(10) Patent No.: US 6,926,199 B2
(45) Date of Patent: Aug. 9, 2005

(54) METHOD AND APPARATUS FOR STORING PERSONALIZED COMPUTING DEVICE SETTING INFORMATION AND USER SESSION INFORMATION TO ENABLE A USER TO TRANSPORT SUCH SETTINGS BETWEEN COMPUTING DEVICES

(75) Inventors: Michael Jay, Bellingham, WA (US); Ronald P. Uhlig, Carlsbad, CA (US); William G. Bloom, Encinitas, CA (US); Rodney W. Guenther, Carlsbad, CA (US); Sharon S. Ross, San Diego, CA (US); John Watson, San Diego, CA (US)

(73) Assignee: Segwave, Inc., Carlsbad, CA (US)

( * ) Notice: Subject to any disclaimer, the term of this patent is extended or adjusted under 35 U.S.C. 154(b) by 0 days.

(21) Appl. No.: 10/722,273

(22) Filed: Nov. 25, 2003

(65) Prior Publication Data

US 2005/0109828 A1     May 26, 2005

(51) Int. Cl.[7] ............................ G06F 17/00; G06F 9/00; G06F 3/00
(52) U.S. Cl. ................. 235/375; 715/765; 715/744; 715/747; 235/382; 235/487
(58) Field of Search ....................... 235/492, 493, 235/375, 487, 382; 345/744, 745, 748; 713/159, 713/182, 100; 714/6; 715/744–47, 765, 52, 715/53, 57, 58, 740, 805; 725/46

(56) References Cited

U.S. PATENT DOCUMENTS 4,820,167 A    4/1989  Nobles et al.
5,442,342 A *  8/1995  Kung .......................... 340/5.27
5,633,484 A *  5/1997  Zancho et al. ............... 235/380
5,845,326 A * 12/1998  Hirayama et al. ........... 711/135
6,012,143 A *  1/2000  Tanaka ........................ 713/200
6,038,551 A    3/2000  Barlow et al.
6,260,111 B1   7/2001  Craig et al.
6,314,425 B1 * 11/2001  Serbinis et al. .............. 707/10
6,324,378 B1  11/2001  Schlossberg
6,336,585 B1 *  1/2002  Harada ........................ 235/380
6,530,083 B1   3/2003  Liebenow (Continued)

FOREIGN PATENT DOCUMENTS

JP     02205906 A  *  8/1990  ............. G06F 1/00

OTHER PUBLICATIONS

Lara Sterzing, Smart Card Technology and Applications, http://disc.cba.uh.edu/~rhirsch/fall96/lara.htm, for DISC 6341 Information Systems, Sep. 23, 1996.*

(Continued)

*Primary Examiner*—Karl D. Frech
*Assistant Examiner*—Daniel Walsh
(74) *Attorney, Agent, or Firm*—Polster, Lieder, Woodruff & Lucchesi LP

(57) ABSTRACT

An external data storage device and program are provided to enable computing device users to transfer personalized interface settings from one computing device to another, so that the user will have a desired and familiar computing device interface no matter what computing device is used. Additionally, the external data storage device and software allow for the user to automatically open files and applications which were opened at the end of a prior sessions, so that the user can continue working from where he/she left off at the end of the prior session.

27 Claims, 9 Drawing Sheets

U.S. PATENT DOCUMENTS

| | | | |
|---|---|---|---|
| 6,728,877 B2 * | 4/2004 | Mackin et al. | 713/100 |
| 2002/0135613 A1 * | 9/2002 | O'Hara | 345/745 |
| 2002/0147912 A1 * | 10/2002 | Shmueli et al. | 713/182 |
| 2002/0147938 A1 * | 10/2002 | Hamilton et al. | 714/6 |
| 2002/0174329 A1 * | 11/2002 | Bowler et al. | 713/1 |
| 2003/0064351 A1 | 4/2003 | Hillenbrand | |
| 2003/0074524 A1 * | 4/2003 | Coulson | 711/113 |
| 2003/0075599 A1 * | 4/2003 | Takatsuki et al. | 235/380 |
| 2003/0097350 A1 | 5/2003 | ShamRao | |
| 2003/0163555 A1 * | 8/2003 | Battou et al. | 709/223 |
| 2003/0163717 A1 * | 8/2003 | Yoshimoto et al. | 713/193 |
| 2003/0220949 A1 * | 11/2003 | Wilt et al. | 707/204 |
| 2004/0001088 A1 * | 1/2004 | Stancil et al. | 345/748 |
| 2004/0012613 A1 * | 1/2004 | Rast | 345/632 |
| 2004/0037145 A1 * | 2/2004 | Tagawa et al. | 365/222 |
| 2004/0073787 A1 * | 4/2004 | Ban et al. | 713/159 |
| 2004/0095382 A1 * | 5/2004 | Fisher et al. | 345/744 |
| 2004/0103274 A1 * | 5/2004 | Shih-Chieh et al. | 713/2 |
| 2004/0128389 A1 * | 7/2004 | Kopchik | 709/228 |
| 2004/0157638 A1 * | 8/2004 | Moran et al. | 455/550.1 |
| 2004/0243794 A1 * | 12/2004 | Mackin et al. | 713/1 |

OTHER PUBLICATIONS

Copy Protection, Roger Nichols, http://www.rogernichols.com/EQ/EQ_2001_05.html, 2001.*

4migo.com Web Site pages—MIGO by Forward Solutions—"Make an computer your own"—Nov. 21, 2003—15 pages.

The Wall Street Journal on-line—Personal Technology, by Walter S. Mossberg "You Can Lug Home Your Office Computer Inside Your Pocket"-Nov. 20, 2003-4 pages.

MIGO—Getting Started Guide—Table of Contents and 43 pages.

* cited by examiner

METHOD AND APPARATUS FOR STORING PERSONALIZED COMPUTING DEVICE SETTING INFORMATION AND USER SESSION INFORMATION TO ENABLE A USER TO TRANSPORT SUCH SETTINGS BETWEEN COMPUTING DEVICES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates generally to computer-based systems. More particularly, the invention relates to a personal portable data storage device and accompanying application software that executes on a computing device for the purpose of recognizing when the storage device is connected to the computing device and facilitating the customization of the computing device based on information stored on the storage device.

DESCRIPTION OF THE RELATED ART

Computing devices and computer-related technology have become important tools in the educational field for teaching and learning, in the medical field for providing quick and easy access to patient records, as well as in other fields. Computing devices are also commonly found in public libraries, airline clubrooms, internet cafes, etc. In the educational field, educators often rely on multi-media presentations and educational software as another avenue to promote learning and to assess student knowledge. A myriad of computer software applications are designed to work as teaching tools for students of any age. Unfortunately, computing devices, and the related software and peripherals, are expensive. Hence, most schools cannot afford to purchase computing devices for all the students. The students thus share computing devices. While this works well, it does not readily allow for the students to have "personalized systems" on the computing devices. Some systems, such as Windows® operating systems allow for different users to log onto the computing device, and for each user to have their own personalized settings. However, these personalized settings are resident on only one computing device, and cannot be transferred to different computing devices. Thus, a student, who may change classes several times a day, and thus be required to use several different computing devices in one day, would not be able to move the personalized settings from one computing device to the next.

In the medical field, computing devices are present, for example in nurses stations and examining rooms. Certain hospital staff can log on to these computing devices to access patient information. However, computing devices are too costly to put one with every patient. As a result there are frequently situations or locations in which such a computing device is not available when access to a patient's records is important.

A few computer-based personal storage applications are configured to record information for individual students. For example, U.S. Pat. No. 6,260,111 to Craig et al. discloses a system for managing the power uses of network computers. The system includes a smart card having a CPU and a memory. User power management preferences are stored on the smart card. When the smart card is inserted into the network computer, the network computer incorporates the power management preferences. U.S. Pat. No. 6,530,083 to Liebenow discloses a system for controlling the settings of an entertainment system, such as a television, stereo, etc. Personal preferences are stored on the unit, and can be recalled to automatically set the preferences for the unit, or can be merged with the preferences of other users to provide a "merged" profile. While it is convenient for a user to be able to automatically recall his/her own personal settings for a particular entertainment system, Liebenow does not provide for transportability of these preferences. U.S. Pat. No. 5,633,484 to Zancho et al. overcomes some of the short falls of the Liebenow system by providing for a card on which is stored certain attributes including font preference and display attributes, such as contrast, brightness, background pattern, color, icon type, and icon location. The devices which accept the card (such as computers, telephones, radios, etc.) operate software which reads the card and then implements the chosen attributes. US Published Application No. 2003-0097350 to ShamRao discloses another system which utilizes a card on which user preferences, such as noted in the Zancho patent, are stored.

These existing systems have various difficulties. Some are difficult to use. Others require that each user have their own computing device—an expensive option for a school.

There is a need for simpler methods and systems for recording computing device settings and user information on portable data storage devices that is normally retained in the possession of the individual and which may, in turn, be read on a variety of computing devices by software that makes setting changes within the device so that the user always sees a consistent interface, regardless of the computing device used.

BRIEF SUMMARY OF THE INVENTION

As discussed more fully below, the present invention provides for a storage device on which a user can store personalized computing device settings and information relating to use sessions, and software which enables a user to transport these preferences from computing device to computing device. The software reads the data on the storage device to alter the settings of a current or host computing device to correspond to the user's preferences, and to open applications and files which were open at the end of the user's previous session such that the current session is initiated at the state of the prior use session at the end of the prior use session. The main benefits of this invention are two fold. First, by allowing a user's data and interface settings to be stored on a removable data storage device, the user can move from computing device to computing device and see as well as use a consistent user-defined interface on the different computing devices by connecting the data storage device to the computing device. Second, users with data storage devices may share generic computing devices, thus reducing the cost of providing computing devices to institutions such as to schools, medical care facilities or other facilities where there is not a real need for individuals to have their own computing devices. Instead of needing one computing device for each user, this invention will allow for multiple users to share one computing device. However, when the users use their own personal data storage devices, the computing device will be personalized for the particular user when the computing device is running the software. This means that, upon connecting her/his storage device to any computing device, the computing device's display looks exactly as it did when the user last used the storage device with another computing device; with icons having the same meaning; with each icon in the same relative location on the display; with all work in progress at the same place, whether a spreadsheet, e-mail, word-processing, book-reading, calendar, reminder, or other application; with the same apparent access path to all stored data; and with the same application associations for each of the user's files.

The methods and systems of the present invention have several aspects. Without limiting the scope of this invention as expressed by the claims that follow, certain inventive embodiments will now be discussed briefly. After considering this discussion, and particularly after reading the section entitled "Detailed Description of the Preferred Embodiment" a person of ordinary skill in the relevant technology will understand how the features of this invention provide advantages in the storage of user profiles and data on removable data storage devices, related control software that run on computing devices and their use in an educational and other settings.

One aspect of the invention is a data storage device to which a computing device can be connected and on which is stored a user's identification, computing device settings, working data, files, and applications. The data storage device is preferably a memory device which can be removably connected to the computing device to enable the computing device to communicate with, and read and write to the storage device. The storage device can also be a disk (such as a floppy, CD, DVD, Jazz, etc.) or space on a remote networked computing device. The data storage device can be connected to and disconnected from a computing device, such as a personal computer, tablet computer, handheld computer, Personal Data Assistant (PDA) or other computing device. Software that operates on the computing device is activated when the data storage device is connected to the computing device. This software functions to ensure the authenticity of the user of the data storage device, retrieve personalization parameters from the removable data storage device that may impact the interface or other temporary settings on the computing device which are adjusted based on the personalization parameters, load data and files from the storage device to the computing device for a user session, and store the current setting of the computing device. At the end of a user session, the software writes user's data and files from the computing device to the data storage device and/or a networked computing device (such as a network server). Any user files that were copied to the computing device are deleted from the computing device. If the software is not already installed on the computing device, the personalization/synchronization software may be installed or run from the removable data storage device. The software and removable data storage device are preferably operating system independent.

During a user session, the software periodically backs up the user data to the storage device to protect against, for example, a premature disconnection of the storage device from the computing device or from the computing device crashing. Should the user disconnect the storage device from the computing device prior to logging out of a user session, the software will give the user the opportunity to reconnect the storage device to the computing device.

Further, the software allows the user to "check out" files residing on the current host computing device or a network to which the computing device is connected. When the user "checks-out" a file, the software marks the file on the computing device or the network as being "protected" so that others cannot modify or otherwise alter the file while the file is "checked out". At the end of the user session, the user is provided with a list of files that were checked out and given the option to update the files on the computing device or network. If the user opts to update the files, the files will be copied from the storage device to the computing device or network. The files will then be released, so that others may have access to the files.

BRIEF DESCRIPTION OF THE SEVERAL VIEWS OF THE DRAWINGS

The above and other aspects, features, and advantages of the invention will be better understood by referring to the following detailed description, which should be read in conjunction with the accompanying drawings, in which.

Corresponding reference numerals will be used throughout the several figures of the drawings.

DETAILED DESCRIPTION OF THE INVENTION

Figure 1A:
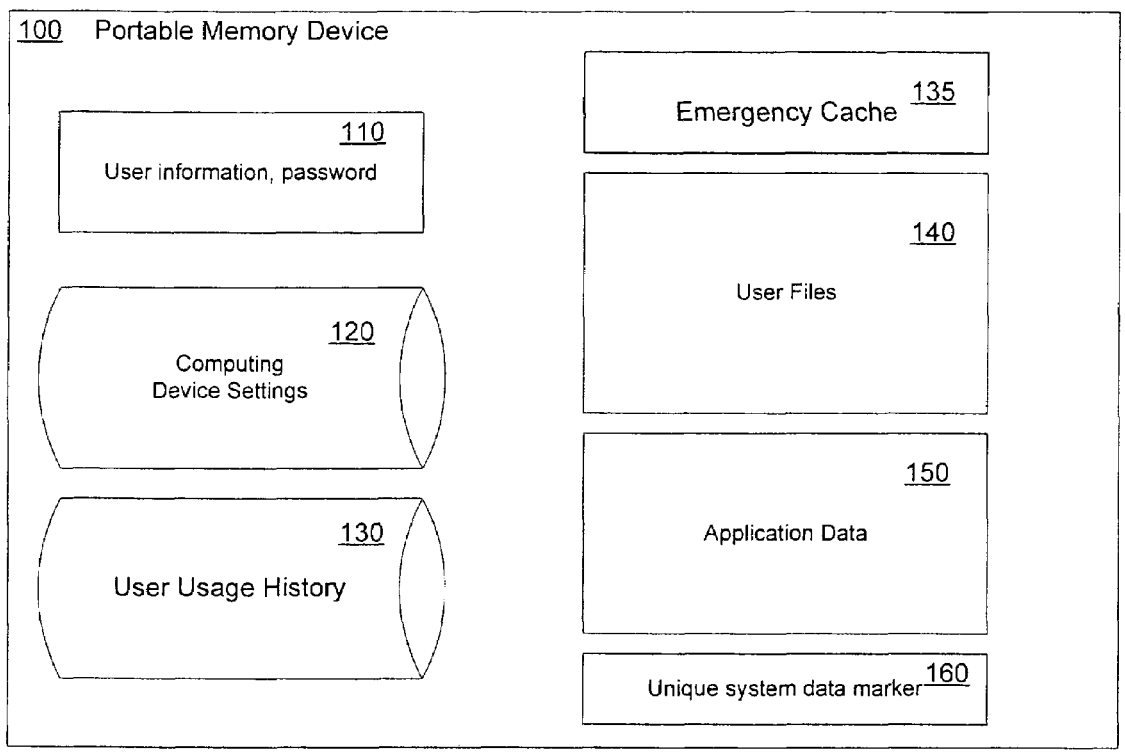
FIG. 1A is a block diagram of the fundamental storage characteristics of a removable data storage device of the present invention.

The following detailed description illustrates the invention by way of example and not by way of limitation. This description will clearly enable one skilled in the art to make and use the invention, and describes several adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Overview

In a broad overview, the system of the present invention includes a data storage device 100 that is connectable to a computing device C. The data storage device is preferably a portable device which may have data written to it, to which the data can be altered or deleted, and to which additional data can be added. Preferably, the data storage device is one that has no moving components, such as PCMCIA, CompactFlash, smart media, USB Flash drives, smart cards, PC cards, and the like. However, the data storage device can also include rotatable disks, such as floppies, CD's, DVD's, JAZZ disks, removable hard drives, etc. Such rotatable discs can be contained within a housing, as would be the case for a removable hard drive, or can be discs which are then inserted in a disk drive of the computing device. Further, the storage device can comprise a remote computing device to which the computing device is connected over a network. The computing device C can be a personal computer, tablet computer, handheld computer, PDA or other type of computing device. As will be discussed below, software functions to ensure the authenticity of the data storage device, retrieve personalization parameters from the removable data storage device that may impact the interface or other temporary settings on the computing device, adjust the settings for the computing device based on the personalization parameters stored on the data storage device, load data and files from the data storage device to the computing device, and write data and files from the computing device to the data storage device. Some or all of the contents of the data storage device may also be backed up on a remote computing device to which the host computing device is connected over a network. As will also be discussed below, when the device 100 is connected to the computing device C, the software reads the information from the portable storage device 100, and uses that information to show a personalized interface on the computing device C. Thus, the user can connect the storage device 100 into any computing device running the software and, in effect, have their own personalized computing system while they are using the particular computing device. Hence, with the storage device 100, a user can turn any computing device into his/her "own" computing device. Because the storage device is intended to allow an individual to transport computing device setting preferences and user session information between different computing devices, the storage device 100 is preferably a device that is personal to the particular user, and is intended to store the information of only one user. That is, a single storage device is not intended to be used by more than one user.

The software associated with the data storage device can register when the data storage device is connected to the computing device C. If the computing device is not already on at the point the removable data storage device 100 is connected to the computing device C, the software automates the start-up, wake up, or 'power on' process for the computing device to turn on. A prerequisite for this function is that the computing device have the ability to 'wake up' via a hardware interrupt signaled by the connection of the data storage device 100 to the computing device C.

Although the invention is described with reference to students and for use in educational settings, it will be apparent to those skilled in the art that the invention has much wider applicability, and can be used in any environment in which a few computing devices are shared by several individuals. Such environments include for example, hospital applications such as a small personalized storage device holding all patient information that is attached to the patient's wrist and connected to a portable computing device (possibly wirelessly), such as tablet computer, PDA, etc., which is carried by authorized hospital personnel, or physician applications utilizing a wallet sized card containing all of an individual physician's patient records, that can be used in computing devices in the physician's office, or in the computing devices at any hospital, or individual applications employing a small device that enables an individual user to continue his/her work seamlessly across computing devices at public libraries, internet cafes, airline clubrooms, universities, etc.

A schematic illustration of the removable data storage device 100 is shown in FIG. 1. The removable data storage device 100 will store user information and password 110, computing device settings 120, user usage history 130, an emergency cache 135, user files 140, application data 150, and a unique system data marker 160. The user information 110 identifies the user. The device settings 120 include items such as computing device display background settings, computing device display color preferences, icons and location of those icons on a computing device display, audio settings within the computing device, including volume settings, computing device display font settings, and computing device printing preferences. The user usage history 130 contains information as to which files were last accessed and which files the user has "checked out". The emergency cache 135 contains user file information and data which is temporarily saved during a user's session. User files 140 include the user's files such as electronic books, files (such as word processing documents, spreadsheets, presentations, etc.), media (such as audio/visual files), etc. Application data 150 includes a list of applications expected and previously used by the user, templates for the various applications, spell checking dictionaries, etc. The unique system data marker 160 is an identifier, akin to an electronic serial number, that is unique to each removable storage device and which can be used to identify individual storage devices and verify that the storage devices are authentic.

Figure 1B:
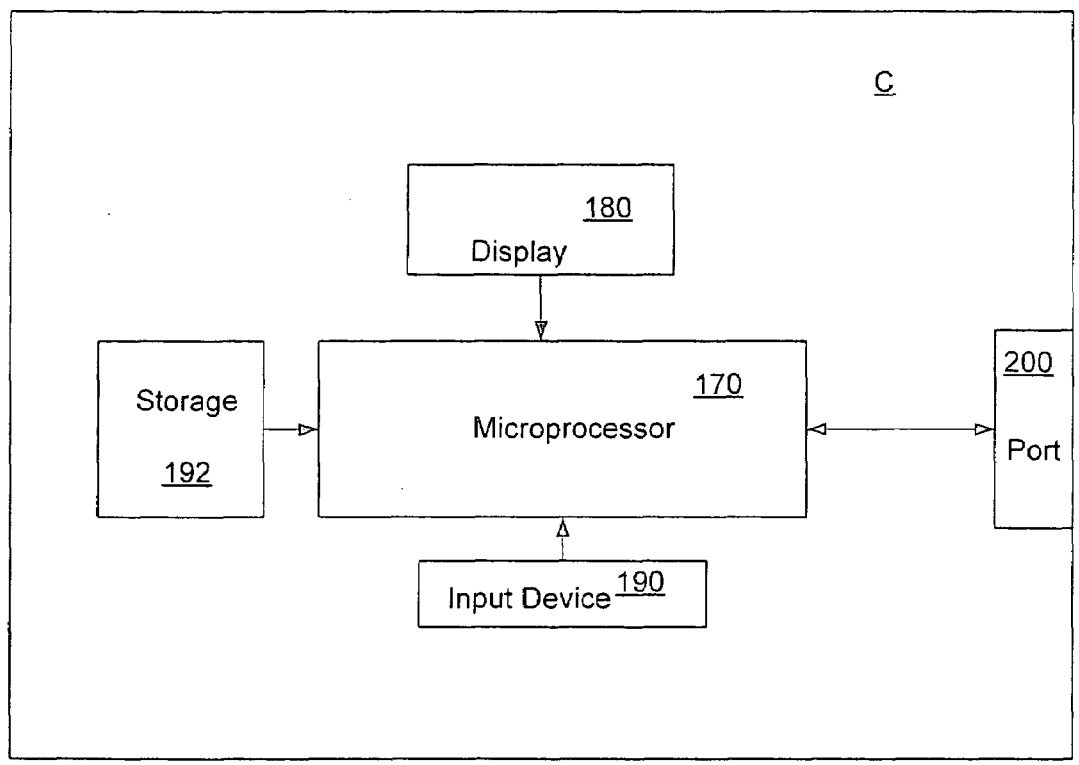
FIG. 1B is a block diagram of a basic computing device to which the removable data storage device is connected.

A basic computing device C to which the removable data storage device is connected is shown generally in FIG. 1B in block diagram format. The computing device includes a microprocessor 170, a display 180, at least one input device 190, a storage device 192, and a port 200 to which the storage device 100 is connected or inserted. The input device 190 can be a keyboard, rollerball, mouse, microphone (for voice recognition systems), touch screen, or any other device which can transmit user supplied information to the computing device. The storage device 192 can be disk space (such as on a hard drive) or RAM, ROM, or other types of memory devices. The port 200 can, for example, be a USB port into which the portable storage device can be at least partially inserted. Alternatively, the port can be a peripheral device, such as a reader, into which the portable storage device is inserted. As noted above, the data storage device can also be a disc. Hence, if in disc form, the port then is the appropriate disc drive of the computing device. The port could also be a wireless connection, (such as an infrared connection, IEEE 802.15.1 (Bluetooth) connection, IEEE 802.11a connection, IEEE 802.11b connection, IEEE 802.11g connection), wired connection (such as a modem-type connection) or other port or connection standard which will allow the computing device to connect to and read from and write to the storage device.

Figure 3:
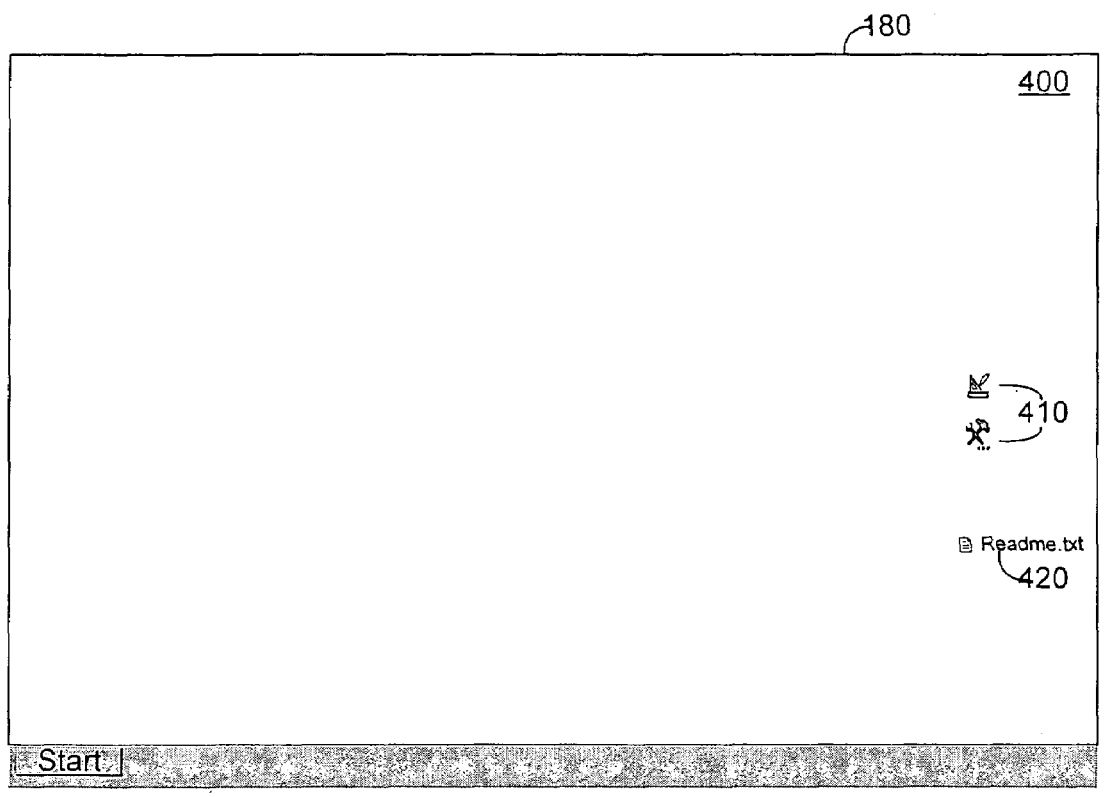
FIG. 3 is a view of a computing device screen before the removable data storage device has been connected to the computing device.
Figure 4:
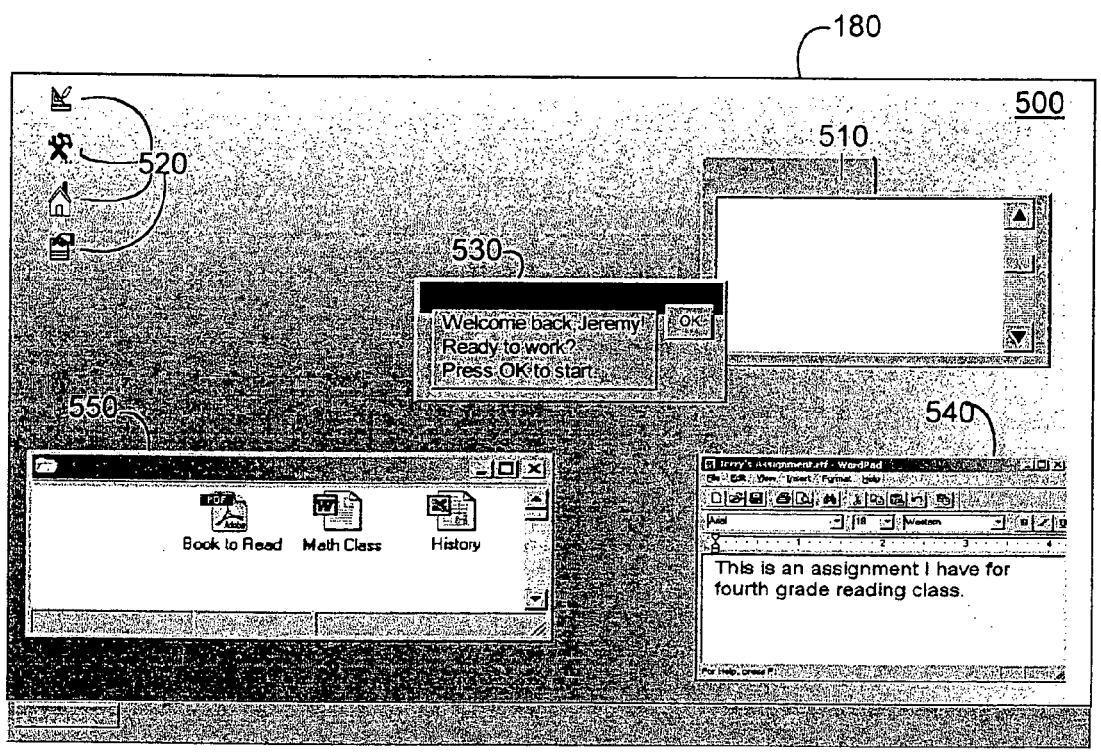
FIG. 4 is a view of a computing device screen after the removable data storage device has been connected to the computing device and the software has loaded and applied the personalization data and loaded and opened any files previously remaining open from a prior use session.

FIGS. 3 and 4 show a computing device before and after a storage device has been connected to the computing device and the software has been run. Prior to connecting the storage device 100 to the computing device C, the computing device C might appear as shown in FIG. 3. Upon connecting the storage device to the computing device, the program of the present invention will be run, as described below, to provide a personalized interface on the computing device to load certain files onto the computing device based on the data stored in the storage device, to start any applications that were open at the end of the user's previous session, and to open any files that were open at the end of the user's previous session, preferably to the point in the files where the user was working. An example of what a computing device display could look like after the software has run is shown in FIG. 4. The user then can use the computing device during a user session, and the computing device will, in effect, appear and act like the user's own computing device. After a user session is ended, the user logs out, as discussed below, to terminate the session. Once logged out, the user can disable the connection between the computing device and the storage device. If the storage device is a portable storage device (such as a disk, memory device, etc), disabling the connection comprises removing the storage device from the computing device. On the other hand, if the storage device comprises a remote computing device, disabling the connection includes terminating the communications link between the host computing device and the remote computing device (e.g., logging the host computing device off of the network to which the remote computing device is connected). The computing device will then return to its previous state (i.e., its state prior to the initiation of the use session) as shown in FIG. 3. The user can then connect a different computing device to the storage device. On this second computing device, the software will again run to give the user the same interface as appeared on the first computing device. Preferably, the storage device 100 can be used on computing devices running different operating systems as well as different versions of one operating system (e.g. the various versions of Windows). Additionally, the software can be written in any desired programming language.

FIGS. 2A–E are flowcharts showing the different aspects of the software of the present invention. This software runs on the computing device C to which the removable data storage device 100 is connected and interacts with the data storage device to read data from the storage device 100 and write data to the storage device. The software is designed to wait for and recognize the connection of the data storage device 100 to the computing device C and facilitate retrieving data from the storage device, updating the computing device C to present a user's desired interface, and saving data back to the removable data storage device 100 when a user's session is complete.

Figure 2A:
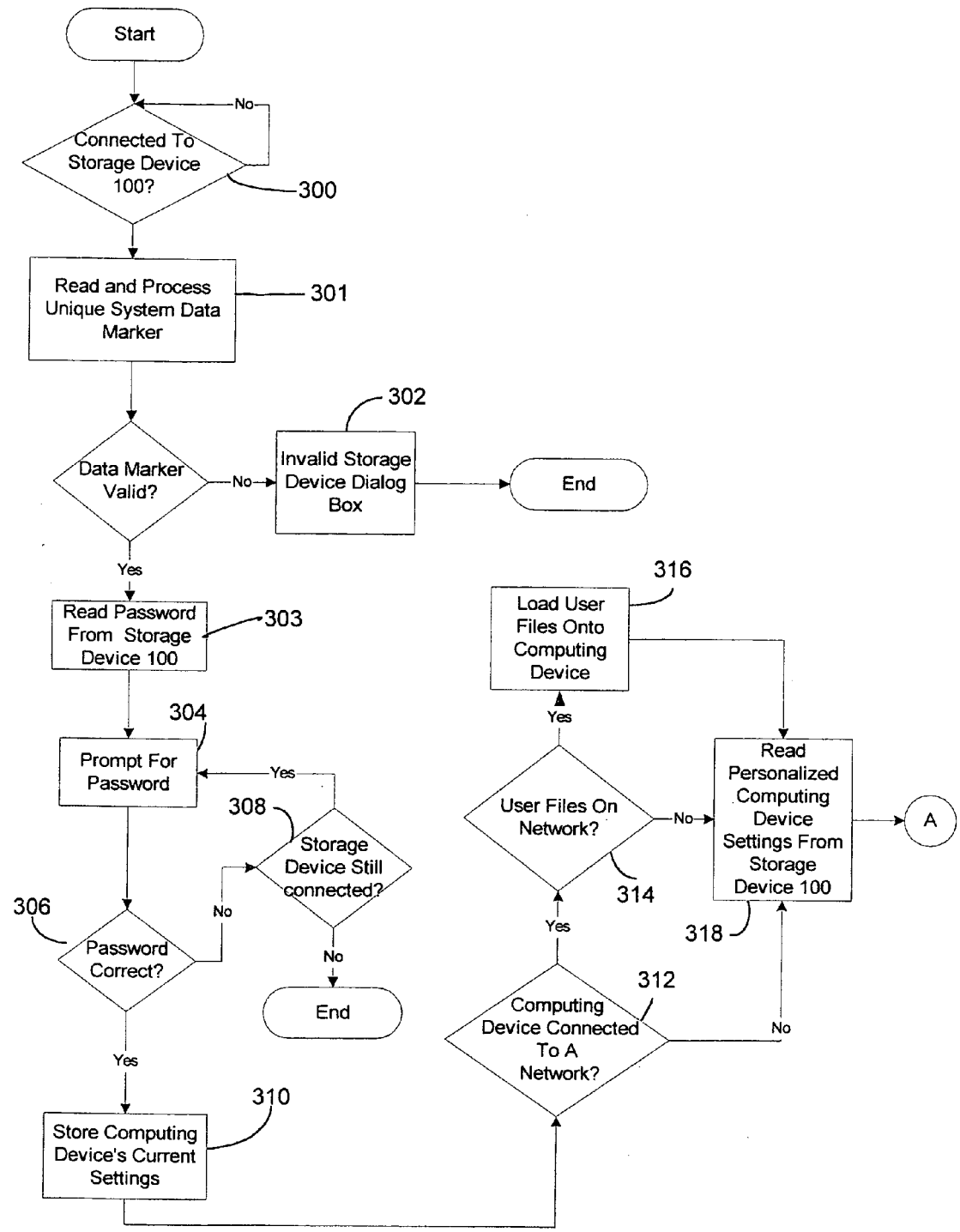
FIGS. 2A–E contain flow charts of the software of the present invention which loads the user's computing device personalization information and application and file usage information stored on the removable data storage device on the computing device.
Figure 2B:
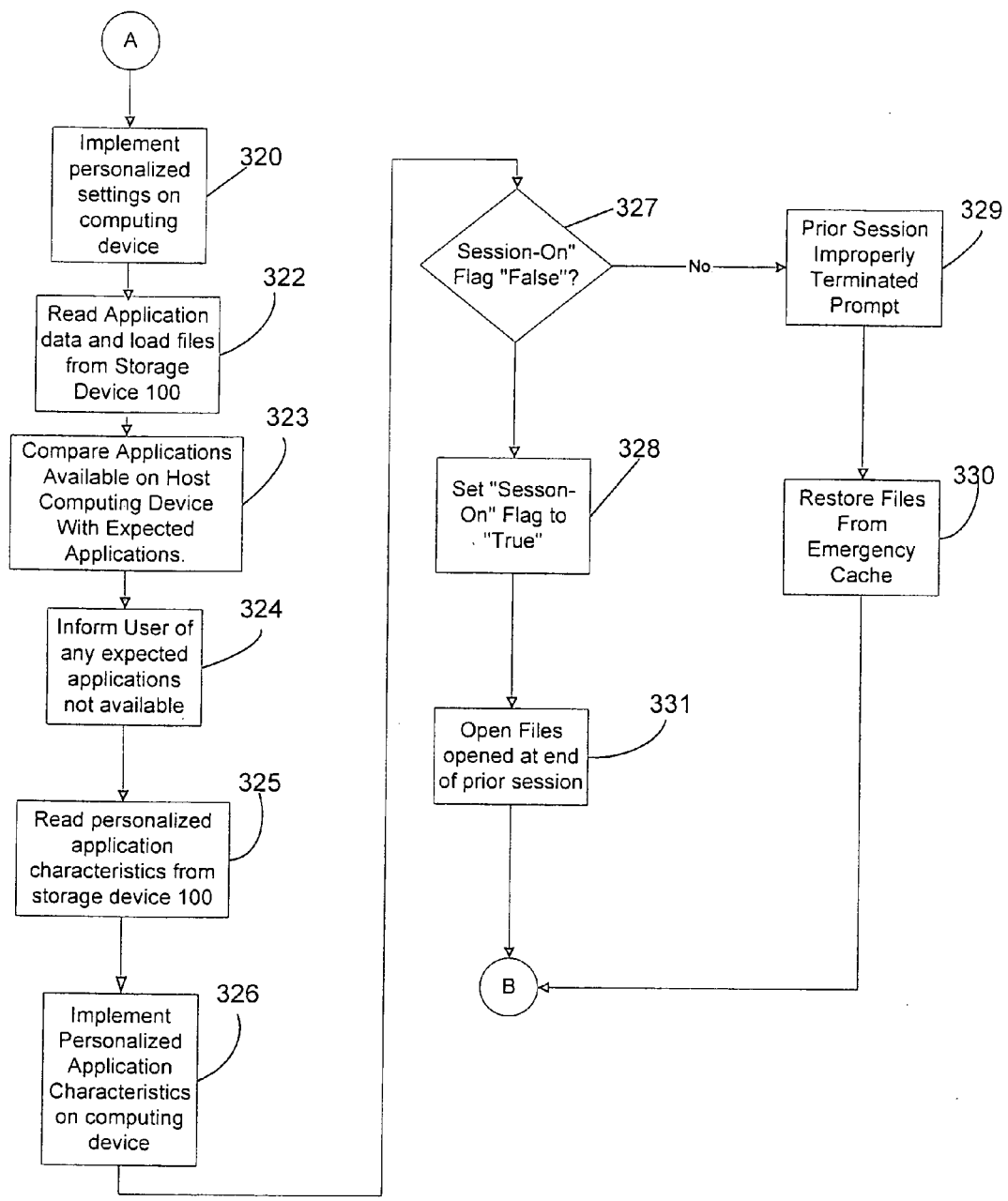
Figure 2C:
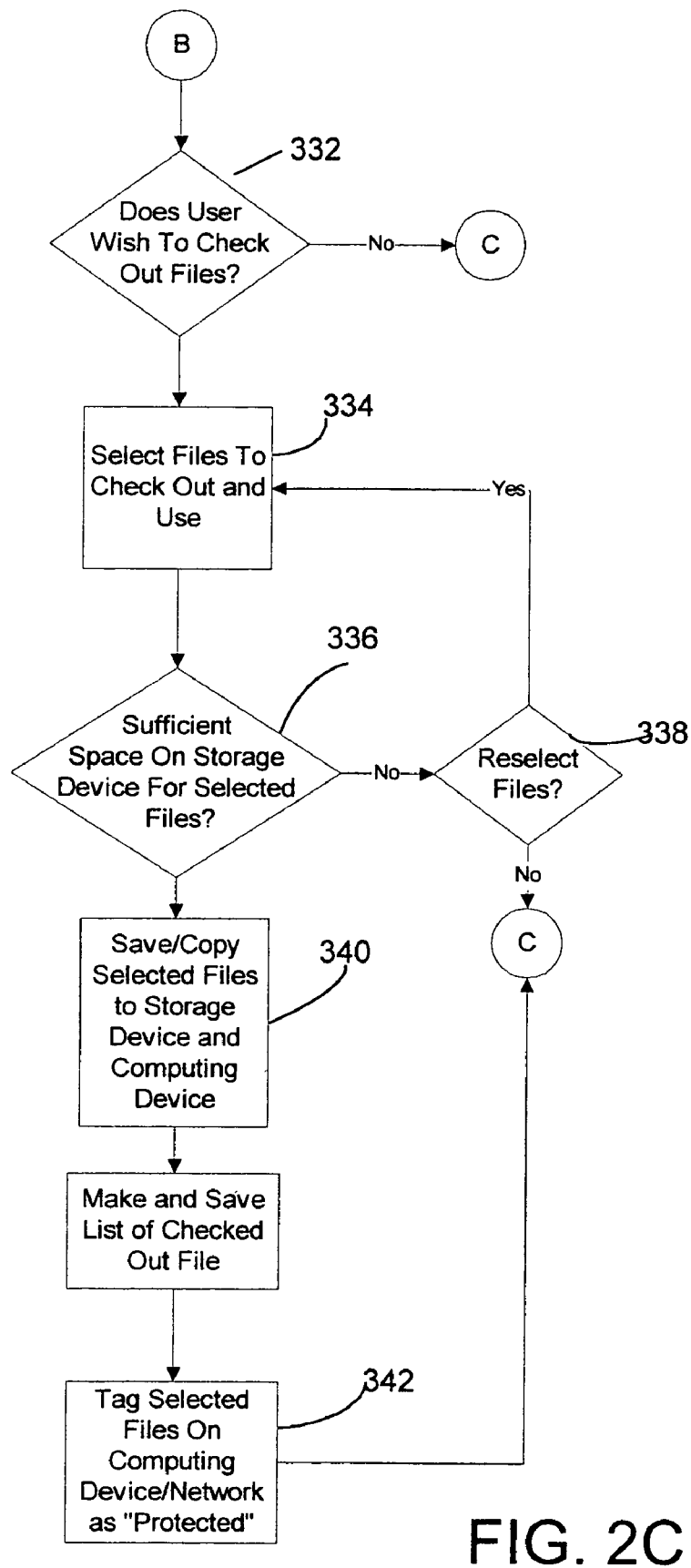
Figure 2D:
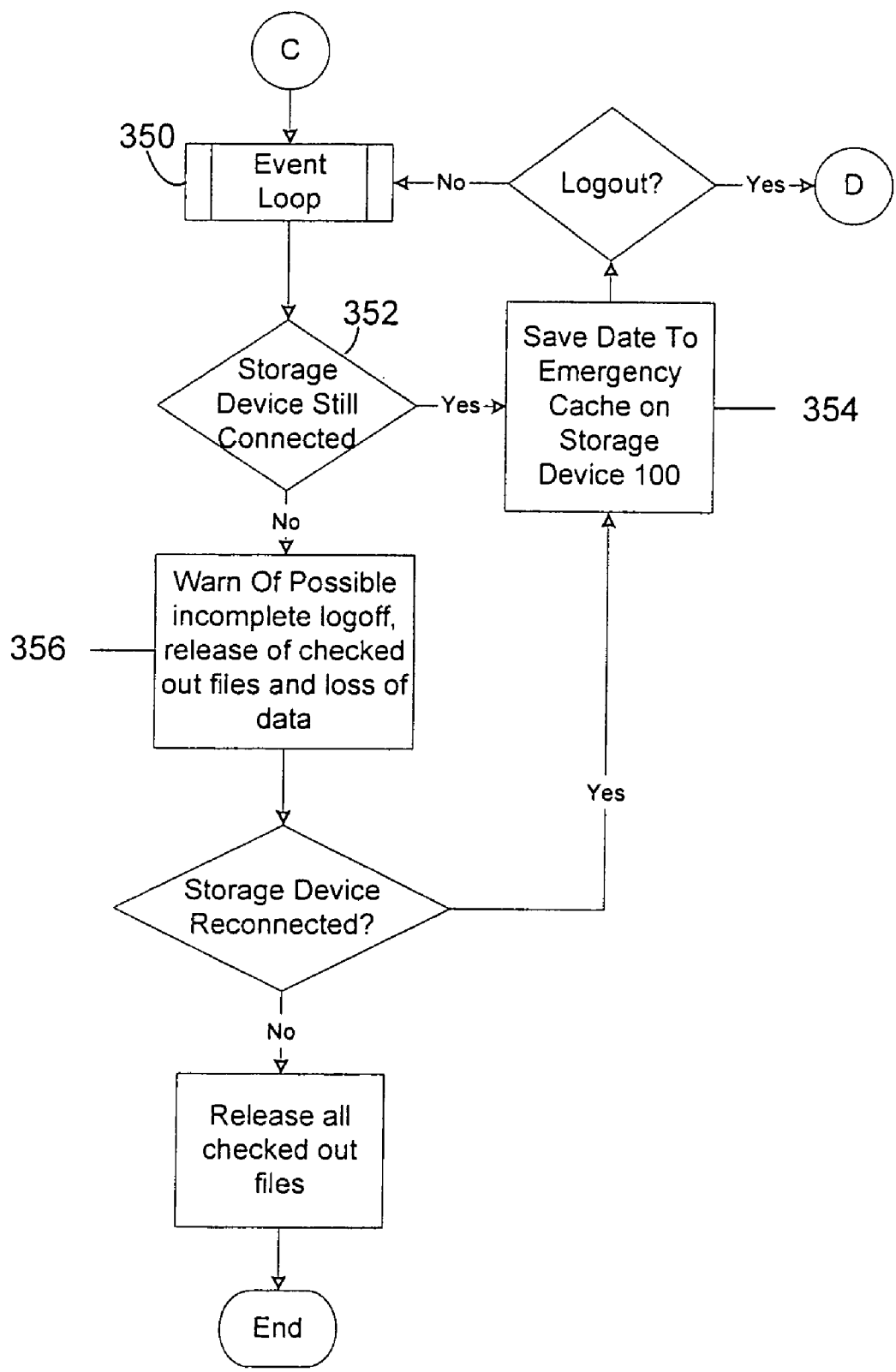
Figure 2E:
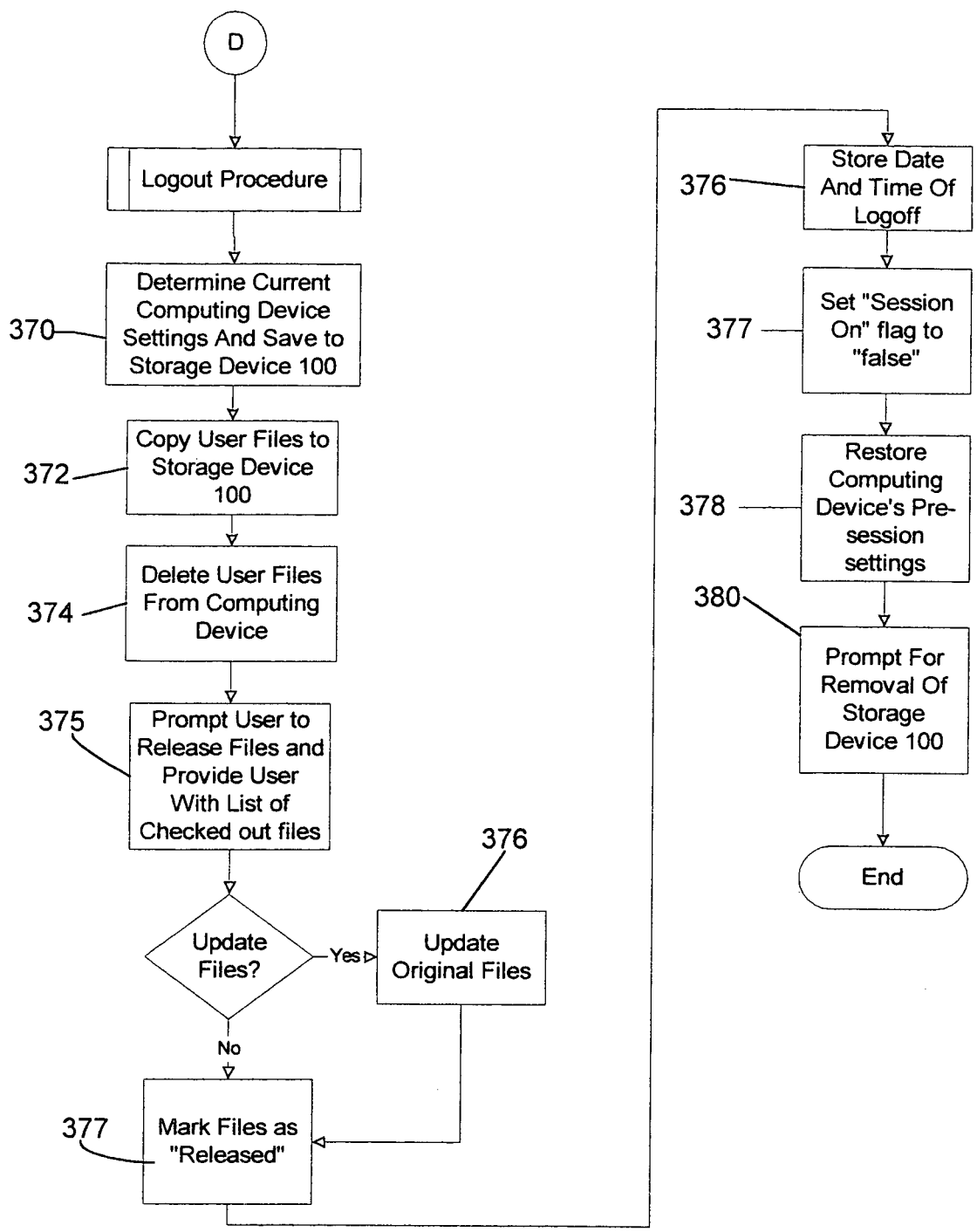

If the software (or program) is resident on the host computing device, the software application is started when the computing device is first turned on and runs in the background awaiting connection of the storage device 100. The software can, alternatively, reside on the storage device 100, in which case, the software starts upon connection of the storage device 100 to the computing device C. In either event, the software will preferably automatically be initiated when the storage device is connected to the computing device. Alternatively, the computing device can be provided with an icon or other means to allow the user to initiate the software after a connection between the computing device C and the storage device 100 has been established. Turning to FIG. 2A, the software, at 300, polls the host computing device's operating system to monitor the port 200 or other connection. When a successful connection between the storage device and the computing device has been completed, the software, at block 301, reads the unique system data marker 160 on the storage device 100. The unique system data marker 160 is a file containing numeric or alphanumeric data which is unique for each storage device. The software processes the data with an algorithm to verify that the marker 160, and hence the storage device 100, is authentic. If it is determined that the storage device 100 is not authentic, then the software will display a dialog block 302 indicating that the storage device 100 is not valid. The software will then end. The unique system data marker 160 is provided to help guard against unauthorized storage devices. If desired, the unique system data marker 160 and the software routines associated with the marker 160 can be omitted without affecting the functionality of the invention.

If the storage device 100 is found to be authentic, the software will, at block 303, read the user information data 110 of the removable data storage device. The software then, at block 304, initiates a dialogue screen prompting the user to enter his/her password. At 306, the software verifies that the password is correct. If the password is incorrect, then the software will, at block 308, monitor the port 200 to determine if the user disconnects the storage device 100 from the port. If the storage device 100 is disconnected from the computing device, the software program will end. If the storage device remains connected to the computing device C, the software will return to the password prompt screen, at block 304, and again prompt the user for the password.

If the password is correct, then the software, at 310, stores the current settings of the computing device C in the computing device's internal storage 192. This will allow for restoration of these prior or default settings when the user logs off and disconnects the data storage device 100 from the computing device C, as described below.

After the user has entered a proper password, the software begins the process of restoring the user's preferences to the computing device. First, the software, at block 312, will determine if the computing device is attached to a network. If so, the software, at block 314, can query the network server to determine if the current user has any files stored on the server. If there are files for the user on the server, then the software, at block 316, will load the files from the server for the current user into the computing device. If there are no files for this user on this server, then no file loading occurs.

After loading network files, if necessary, or if the computing device C is not connected to a network, the software, at block 318, reads the personalized computing device system settings 120 from the removable data storage device 100; and, at block 320 (FIG. 2B), implements the settings and sets the computing device settings accordingly.

After setting the system settings to the user's desired settings, the software, at block 322, reads any application data files from the data area 150 of the removable data storage device 100. The software, at block 323, determines which applications are available on the host computing device and compares this with the list of expected applications from the application data 150 as stored on the storage device 100. At block 324 the software will inform the user if there are any expected applications which are not available on the host computing device. The software, at block 325, then reads any application characteristics from data area 150 of the data storage device 100 and, at block 326, sets up the program preferences accordingly.

After setting the system and application settings to the user's desired settings, the software, at 327, checks a "session-on" flag which is part of the user usage history 130. When a user begins a session, the "session-on" flag is set to "on" or "true", and when a session is properly terminated, the "session-on" flag is set to "off" or "false". In block 327, the software is checking to ensure that the prior session was properly terminated, and hence, that the "session-on" flag is set to "false". If the "session-on" flag is set to "off" or "false", the software will, at 328, set the flag to "on" or "true", and continue with the program, as described below. If the "session-on" flag is set to "on", the software will display a dialog box 329 which will notify that user that the prior session was improperly terminated, that some information from the prior session might have been lost. The software then restores affected files at 330 from the emergency cache 135. As described below, the user's work is periodically saved to the storage device 100. Hence, if the prior session was improperly terminated, the files will first be loaded from the user file data 140, and the affected files will be restored from the emergency cache 135. If desired, a prompt could be provided to give the user the option of whether or not the affected files should be restored.

After the user's files have been loaded onto the computing device, the software will, at block 331, open any application software that was opened at the end of the prior session and open any files within such application programs that were opened at the end of the prior session. This will restore the user to the state of the immediately prior user session. The software can be set to prompt the user as to whether or not the prior session should be restored. If the user is provided with a prompt, and opts not to restore the state of the prior session, the software will provide a screen showing the icons available when all applications are closed.

At this point, the software can prompt the user, as in block 332 (FIG. 2C), if the user wants to "check out" any files on the host computing device C or a network to which the computing device may be attached. If the user does not desire to "check out" any files, then the software executes an event loop 350 (FIG. 2D), as described below. If the user does wish to "check out" files, the user, at block 334 (FIG. 2C), will be presented with a file selection box. The file selection box may take any desired form, but preferably allows for the user to select multiple files at a single time. The files desired to be checked out are to be copied to the storage device 100, so, the software, at block 336, checks to determine that there is sufficient space on the storage device. If there is not enough space on the storage device 100, the user will be informed that there is insufficient space to copy all the selected files to the storage device 100, and, at 338 will be given the option to reselect files. If the user opts to reselect files, the software will return to the file selection menu at block 334. If the user opts not to reselect files, the software will jump to the event loop 350 (FIG. 2D) and the user will not have checked out any files. Once the user successfully selects which files he/she wishes to check out, the software, at 340 copies the selected files to the storage device and to the host computing device and makes a list of the checked out files for later use. The list of checked out files is saved on the storage device. Lastly, the software block 342, tags the selected files on the host computing device or the network as being "protected". This will prevent another user on the network from opening and editing the file while the current user has the file "checked out". Should a different user attempt to open a file that is checked-out, such a user would get a message that the file is locked, and that the file can be opened as a "read-only" file.

At this point the user will have all of his/her files, applications and settings configured and ready for use on the host computing device. The computing device is personalized per the user's preferences, and the user's programs/applications are available for him/her to use. Additionally, as noted, if any application programs were open at the end of the user's last session, such applications will be opened at the start of the current session, and the files that were then in use will be opened within the application. Thus, for example, if the user had a spreadsheet opened at the end of the prior session, the same spreadsheet will now be opened in the spreadsheet application on the host computing device.

The user is now in an active session, with the computing device C set up with the user's preferred device settings and the user's files readily available. The user can now use the applications to carry out tasks such as, but not limited to, reading files, editing files, deleting files, creating new files, continuing with another application, such as an exercise in a math application, which was opened at the end of the previous user session, or anything else the user desires, using the various applications available to the user on the host computing device.

An event loop 350 (FIG. 2D) runs while the user is in an active session on the host computing device. The event loop runs at a regular interval. At block 352, the software polls the host computing device's operating system for the status of the data storage device to ensure that the storage device 100 is still connected to the computing device C. If the storage device 100 is still connected, the software, at block 354, will store the user's current work data in the emergency cache 135 on the data storage device 100. This saving function can be performed at every loop cycle, or at some regular interval of cycles. If the data storage device 100 has been disconnected from the computing device and the user has not logged out successfully (as described below), then the software, at block 356 will warn the user that all checked out files will be released, that the log off is incomplete and that data may be lost. The software then polls the computing device to determine if the storage device has been reconnected. If the storage device is reconnected to the computing device, the software returns to the event loop. If not, the program will release all checked out files and end.

Periodically saving the user's work data in the emergency cache 135 will help ensure that the user's data is reliably stored on the storage device 100 when the device is removed from a computing device, should the device 100 be prematurely removed from the computing device or if the computing device should malfunction (i.e., crash). Additionally, should the user begin to shut down the computing device prior to logging out of the current session, the software will register that the computing device C is being shut down. In these instances, the user will have the ability to "exit" the user session before potentially losing data. As described above, should the user prematurely disconnect the data storage device 100 from the computing device C, the software will prompt the user, as at 356, to reconnect the data storage device 100 to the computing device C. Similarly, if the software detects that the user is shutting down the computing device, the software will prompt the user with the dialog box 356. This will remind the user that he/she needs to properly log out of the current session to avoid the potential loss of data. Hence, the user can reconnect the storage device 100 if it were prematurely removed, or delay the shut down of the computing device C. In either event, the user will then be able to properly end the current session, as described below, and avoid a potential loss of data. As discussed above, if the user does not properly end the current session, the "session-on" flag will not be set to "off" or "false", and, upon beginning of a new session, the software will notify the user that the user did not logout properly before disconnecting the storage device from the computing device, that the computing device is being restored to the point at which data was last saved to the emergency cache, that all checked out files were released, and that some data may have been lost.

Some computing devices have retention lock solenoids installed as part of the receptacle that accepts a portable data storage device. To prevent premature removal of a portable data storage device by a user during an active session, the software will engage the solenoid when the portable data storage device is inserted in the computing device C. This will prevent inadvertent removal of the storage device prior to logging out. The solenoid will be released after the user has properly logged out and the software has made all necessary backups.

When the user session is started, an icon can be added, for example, in a tray at the bottom of the computing device display 180. When activated, this icon can provide the user with session information and provide a logout button to enable the user to end the current session. To logout, the user will activate this logout button. When the logout procedure (FIG. 2E) is initiated, the software, at block 370 will determine the current computing device and application settings and save them on the data storage device 100. This information includes the application software currently open and the files that were opened within the software. This allows for the user to return to this same state when the user next initiates a session. The software will then, at block 372, copy the user's files into the user file area 140 of the device 100. The software will then, at block 374, delete the user's files from the computing device C. This will help ensure that no other users will have access to the current user's personal files. The software will remind the user of any files that were checked out. At block 375, the software will prompt the user for release of checked out files back to the computing device/network, provide the user with a list of files that are checked out, and give the user the option to update the original file on the computing device or network. Alternatively, the user can be provided with the option of not updating the original file. For example, the user can be provided with a list of files with radio buttons or check boxes next to each file to indicate which files should or should not be updated. Preferably, the software will default to updating the original files, and the user will have to opt not to update. In either event, the edited or modified file will be stored on the user's storage device 100. After the user has indicated which files are to be updated, the software, at block 376, will copy the files indicated to be updated to the computing device or network from which the files were originally retrieved. The software, at block 377, will then remove the "protected" status of the "checked out" files to release the files so that others will have access to the files. After the "checked out" files have been released, the software, at block 378, will record the date and time of the logoff and store this information in the user usage history 130. At block 379 the software will set the "session-on" flag to "off" or "false", so that the software will know that the current session was properly terminated. The software, at block 380, will then restore the computing device C to the default or initial settings, which were saved on the computing device's storage device 192 in block 310. Lastly, the software, at 382 will display a message noting that the session has successfully ended and that the removable data storage device may be disconnected from the computing device C. The user session will then end.

FIGS. 3 and 4 show example host computing device desktop screens before and after connection of the data storage device 100 to a computing device. FIG. 3 shows a possible appearance of the computing device display prior to the data storage device being connected to the computing device and the user logging on to the computing device. In this example, the interface screen shows a simple, no color background image on the interface screen desktop 400. There may be some icons 410 for application programs scattered on the computing device display. There also may be some data file icons 420 on the display. This is how the screen may look on a computing device without any user defined customization settings.

FIG. 4 shows an example interface screen on a host computing device C after a data storage device 100 has been connected to the computing device and the associated software has loaded the user's computing device setting preferences, application preferences and files to start a new user session. As seen, the basic computing device display has been updated with a user defined background 500, a user defined application program 510 has been opened and active data files, if any, have been opened within the desired application. Icons 520 for the user's commonly used applications which are present on the host computing device have been arranged and placed on the screen, and a message 530 has appeared welcoming the user. The user can now begin his session, using any of the applications and files on the computing device. The computing device will appear and perform as if it were the user's own personal computing device.

The software may be used by a system's administrator in addition to the user, allowing the administrator to access the information on a user's removable storage device 100. The system's administrator has greater rights and privileges than the user. For example, the administrator can provide an initial set of preferences for the storage device 100, which can then be changed by the user. The administrator also will have access to the user verification in case the user is not able to remember/locate/etc his password. The user-created preferences can be changed by either the specific user or by an administrator with authorization. The user-created preferences can be erased or deleted from the removable data storage device by the Administrator. The erasing of user preferences allows the removable data storage device to be utilized by a new user. Once the personalized information is deleted from the removable data storage device, it cannot be restored. In a school environment, for example, there will be an Administrator definable time frame to require backups. When backing up to an Administrator machine, the backup process will not prompt for user verification.

The data storage device and the software preferably includes means to prevent unauthorized manufacture of the devices and/or unauthorized use, production or copying of the software. In order to make it difficult to make illegal copies of the storage device and associated software, a special data file will be loaded on the data storage device during manufacture or set-up of the storage device. As noted above, when a user connects the storage device 100 to the computing device C, the software will at 301 (FIG. 2) query the storage device when it is first connected to the computing device to determine if a factory installed file is present on the device. If the file is present, then the portable data storage device will be considered authentic, and the software will read the user's password from the storage device 100 and prompt the user to enter his/her password, at blocks 303 and 304 (FIG. 2A). If this file is not present or the file data is incorrect, then the device will be rejected by the computing device software as being counterfeit. Preferably, the file contains numeric or alphanumeric data which comprises, as noted above, the unique system data marker 160. The software processes the unique data system marker with an algorithm which produces a result. If the result verifies the data (i.e., equals an expected result), then the storage device is found to be valid. If the result does not verify the data, then the storage device is determined to be invalid.

As can be appreciated, the removable storage device and associated software in combination form a system which allows a user to control the settings of a computing device to personalize the computing device. Hence the user can, using the storage device 100, transport his/her preferences for the settings of a computing device between computing devices. Additionally, because the session history is saved, the user can in effect pick up where she/he left off. That is, the software will, upon initiation of a new session, open the applications that were opened at the end of the preceding session, and, within those applications, open the documents or files that were opened.

As various changes could be made in the above software without departing from the scope of the invention, it is intended that all matter contained in the above description or shown in the accompanying drawings shall be interpreted as illustrative and not in a limiting sense. For example, although the storage device 100 is preferably a removable storage device, the removable storage device could be replaced with a remote storage device, such as computing device on a network. In this instance, at the beginning of a user session, the computing device would be connected to the remote computing device, for example, by connecting to the remote computing device over a network or over the internet. The user's information would then be downloaded from the remote storage device to the currently used computing device to allow the user to begin his work session. At the end of the work session, upon logout, the device settings, files and applications used, and files opened at the end of the session would be stored on the remote device. An additional alternative is to have the software resident on the storage device itself. In this instance, the software would be initiated upon insertion of the storage device 100 in the port 200. The data which is saved on the storage device 100 can also be saved on a network, or other remote computing device. The saving of data on a remote computing device can be done in lieu of saving the data on the storage device 100 or in addition to saving the data on the storage device 100. Although the software is described to carry out its various steps and functions in a certain order, the order of these steps, can be changed. Additionally, certain functions can be omitted. For example, and without limitation, the authentication and check out routines can be omitted. These examples are merely illustrative.

What is claimed is:

1. A method of enabling a user of a computing device to transport session information from one computing device to another, the method comprising:

connecting an external storage device to a computing device having a local storage media; the external storage device containing session information and personalized application characteristics, said session information including the user's files, a list of the files remaining opened at the end of the prior session, and a list of applications expected and previously used by the user;

retrieving said session information from said external storage device;

implementing said personalized application characteristics;

enabling said computing device user to open at least one of said files on said list of files remaining opened upon initiation of a new user session;

retrieving personalized setting information which had been previously stored on said external storage device, said personalized setting information including one or more of the following: computing device display background settings, computing device display color preferences, icons and location of the icons on a computing device display, audio settings within the computing device, volume setting, computing device display font settings, computing device printing preferences, and a list of applications found installed on the computing device to which the user has access;

comparing the list of applications found installed on the computing device to the list of applications expected to be found on the computing device and notifying the user of any expected applications which are not found on the computing device; and implementing the personalized settings on the computing device.

2. The method of claim 1 including a step of storing on said device the session information from the current session at the end of the user session.

3. The method of claim 2 wherein said method includes a step of copying files from said storage device to said computing device at the beginning of a user session; said method including a step of copying said files back to said storage device at the end of the user session and then deleting said files from said computing device after they have been copied back to said storage device.

4. The method of claim 1 wherein said external storage device is a removable storage device which is connectable to said computing device.

5. The method of claim 1 wherein said external storage device is a remote computing device on a network; said step of retrieving session information from said device comprising communicating with said remote computing device over said network.

6. The method of claim 1 wherein said method includes storing the settings of said computing device prior to, or upon, the initiation of a use session; and, at the end of the use session, restoring said computing device to the settings existing prior to initiation of the use session.

7. The method of claim 1 wherein said method includes storing any changes in the personalized setting information on the storage device at the end of a use session.

8. A method of enabling a user of a computing device to transport personalized computing device settings from one computing device to another, the method comprising:

connecting a computing device to an external storage device on which is stored personalized computing device setting information has been stored; said personalized setting information including one or more of the following: computing device display background settings, computing device display color preferences, icons and location of the icons on a computing device display, audio settings within the computing device, volume setting, computing device display font settings, computing device printing preferences, and a list of applications expected to be found installed on the computing device;

retrieving personalized setting information which had been previously stored on said external storage device;

implementing the personalized settings on the computing device;

determining if any of the applications expected to be found on the computing device are absent; and;

notifying the user of any applications expected to be found on the computing device which are missing.

9. The method of claim 8 wherein said external storage device is a removable storage device which is connectable to said computing device.

10. The method of claim 8 wherein said external storage device is a remote computing device on a network; said step of retrieving session information from said device comprising communicating with said remote computing device over said network.

11. The method of claim 8 wherein said method includes storing the settings of said computing device prior to, or upon, the initiation of a use session; and, at the end of the use session, restoring said computing device to the settings existing prior to initiation of the use session.

12. The method of claim 8 wherein said method includes storing any changes in the personalized setting information on the storage device at the end of a use session.

13. A software program embodied in a machine readable media and being capable of being operated on a computing device, the computing device comprising a display, a storage device, an input device, and a memory device; the software program being operable to adjust the settings of the computing device and to make available to the user files from a prior session at a different computing device, the program comprising:

means for retrieving personalized setting information which had been previously stored on a storage device removably connectable to the computing device of a current session, said personalized setting information including one or more of the following: computing device display background settings, computing device display color preferences, icons and location of the icons on the computing device display, audio settings, volume settings, computing device display font settings, printing preferences, and a list of applications installed on the computing device to which the user has access;

means for retrieving session information of a prior session from the external storage device, said prior session information including the user's files, and a list of the files remaining opened at the end of the prior session;

means for implementing said personalized computing device settings;

means for allowing administrative access to said storage device to enable an administrator to access, alter and/or erase data, including a user's personalized setting information and passwords, on the storage device; and means for marking selected files on said computing device or on a network to which said computing device is connected as being 'checked out'.

14. The software program of claim 13 including means for storing the settings of the current computing device prior to initiation of a user session and means for returning said current computing device to said settings at the end of a user session.

15. The software program of claim 13 including means for removing any of said user's files from said computing device at the end of a session.

16. The software program of claim 13 including means for copying said user's files from said external storage device to said computing device at the beginning of a user session.

17. The software program of claim 13 including means for loading the personalized computing device settings to said external storage device at the end of a user session.

18. The software program of claim 13 wherein said means for marking said selected files as "checked out" files comprising marking said files as being "protected".

19. The software program of claim 13 including means for releasing said 'checked out' files to enable others to access and modify said files.

20. The software program of claim 19 including means for synchronizing the "checked out" files with corresponding files on the computing device or the network to which said computing device is connected.

21. The software program of claim 13 including means for periodically saving the user's data to the external storage device.

22. The software program of claim 21 wherein said means for periodically saving comprises means for saving changes to a user's data files within a cache memory area on the external storage device.

23. The software program of claim 13 including means for verifying the authenticity of the external storage device.

24. The software program of claim 23 wherein said verifying means comprises a data file on said external storage device; and means for said program to process said data file.

25. The method of claim 8 wherein the personalized setting information stored on the external storage device also includes application characteristics; said method comprising implementing the personalized application characteristics.

26. The method of claim 1 including a step of copying the user's files from the storage device to the computing device.

27. The method of claim 1 including a step of copying said files to a network computer and backing the data on the storage device to a network computer in addition to copying the data back to said storage device at an end of the user session.

* * * * *